United States Patent [19]

O'Dell

[11] Patent Number: 4,529,340
[45] Date of Patent: Jul. 16, 1985

[54] DRILLING METHOD AND APPARATUS

[75] Inventor: David L. O'Dell, Mishawaka, Ind.

[73] Assignee: Wheelabrator-Frye, Inc., Mishawaka, Ind.

[21] Appl. No.: 478,246

[22] Filed: Mar. 24, 1983

[51] Int. Cl.³ .............................................. B23B 51/06
[52] U.S. Cl. ..................................... 408/1 R; 408/59;
184/6.4; 239/113; 407/11
[58] Field of Search ...................... 408/56, 57, 59, 1 R,
408/241 R, 710; 279/20; 409/135, 136; 407/11;
184/6, 6.4, 6.14; 239/112, 113

[56] References Cited

U.S. PATENT DOCUMENTS

| Re. 26,975 | 6/1965 | Borman et al. | 408/59 |
| 3,561,299 | 2/1971 | Brisk et al. | 408/59 |
| 4,345,668 | 8/1982 | Gaunt | 408/59 |

FOREIGN PATENT DOCUMENTS

| 1435166 | 5/1976 | United Kingdom | 408/59 |
| 2005353 | 4/1979 | United Kingdom | 239/112 |

OTHER PUBLICATIONS

R. L. Hatschek, *American Machinist*, Fundamentals of Drilling, Feb. 1979, p. 17.

*Primary Examiner*—Gil Weidenfeld
*Assistant Examiner*—Daniel W. Howell
*Attorney, Agent, or Firm*—Wood, Herron & Evans

[57] ABSTRACT

An improved method and apparatus for supplying a fluid coolant to a tool designed for drilling a hole in a workpiece, wherein a first coolant flow is supplied under pressure in a pulsating flow to the tip of the drill by a first pump with a second and booster coolant flow being supplied in a pulsating flow and under considerably greater pressure than the first flow. The second fluid flow is initiated in response to the build-up of back pressure to the first fluid flow to thereby flush away chips impacted on the drill causing such back pressure. The second fluid flow is terminated in response to the drop of back pressure to the first fluid flow.

28 Claims, 3 Drawing Figures

DRILLING METHOD AND APPARATUS

FIELD OF THE INVENTION

This invention relates to a metal drilling method and apparatus and, more particularly, to an improved method and apparatus for fluid cooling a drill and workpiece during the course of drilling.

BACKGROUND OF THE INVENTION

The present invention represents an improvement upon the drilling method and apparatus of U.S. Pat. No. Re. 26,975, which is assigned to applicant's assignee herein. The disclosure of U.S. Pat. No. Re. 26,975 is hereby incorporated in this application by reference. Briefly, it was found that the cutting efficiency and tool life of a conventional oil hole drill in which coolant is supplied to the drill tip through the interior of the drill is significantly improved by regularly varying the pressure, or pulsing, the coolant fluid supplied to the drill. By so pulsing the flow, such as through regular pulsations of 50 times a minute, tool life was increased by approximately 50%, with feed rates also substantially increased.

Although electric as well as pneumatic motor hydraulic pumps are disclosed in the above identified patent for supplying the coolant to the oil hole drill in a pulsating manner, pneumatic motor driven pumps have generally been found to be most advantageous due to their relatively inexpensive operation and longevity under adverse operating conditions. Additionally, most machine shops have air pressure available in the form of a 90 psi pressure line running throughout the shop for driving small pneumatic motors, such as for portable hand tools so that the power source for a pneumatic pump is generally less expensive and thus far preferred.

It has been observed that the chips created during the drilling operation in the practice of the process disclosed in the above identified patent periodically build-up, become impacted and create a back pressure to the flow of pulsed fluid through the drill. The build-up of back pressure can significantly decrease the rate and therefore the volume of coolant fluid flowing through the drill, resulting in a slower drilling operation and a decrease in the efficiency of the drill. One possible solution to this problem would be to substitute a high pressure volume pulsed flow coolant pump, but for many applications, such a pump operable off of standard shop pressure air lines is not currently commercially available, and the building of a special pump is not economically justified.

It has therefore been one object of this invention to provide an improved method and apparatus for supplying coolant to a drilling tool which minimizes or eliminates chip build-up and impaction at the tool tip. A more specific object has been to provide a coolant supply system for cooling a drill and workpiece during a drilling operation which alleviates the build-up of back pressure to a principal coolant flow caused by chip impaction, etc.

Yet another object of the invention has been to provide a system having a continuous and high volume pulsed flow of coolant to an oil hole drill engaging a workpiece and an intermittant booster high pressure coolant flow which is also pulsed so as to prevent chip build-up at the tool tip.

Yet a further object has been to provide a system for relieving the build-up of back pressure to a continuous and high volume pulsed coolant flow supplied to the drill tip through the interior of the drill employing pneumatically driven pumps.

SUMMARY OF THE INVENTION

These as well as other objects have been accomplished by the present invention which represents an improvement on the practice of supplying a coolant fluid flow under pressure in a pulsating flow through a longitudinal passageway in a drill engaged with a workpiece. The invention primarily comprises supplying a second or booster coolant fluid flow through the same passageway in the drill, with the booster coolant flow being supplied by a second pump in a pulsating flow and under significantly greater pressure than the first or primary flow. The high pressure booster coolant flow is intermittently added to the primary high volume coolant flow in response to the build-up of back pressure to the primary flow beyond a predetermined level, to thereby flush away chips from the the drill causing the back pressure, and is terminated when the chips have been flushed away and the back pressure to the primary flow has dropped below a predetermined level.

This two stage pulsed coolant supply system has produced a marked increase in both the volume of coolant flow through the drill as well as in overall flow pressure when the high pressure booster pump is functioning in conjunction with the lower pressure high volume primary coolant pump. For example, with a back pressure of 500 psig, coolant flow through the drill can be increased by an average of 3 to 4 gpm in this two stage system. The sudden increase in fluid flow and pressure caused by the operation of the booster pump serves to dislodge impacted chips, etc. giving rise to the back pressure, and permits faster drilling speeds and feeds. An additional benefit of this two stage system is that there is a general increase in the number of pulsations in the common fluid flow through the superposition of the two pulsed fluid lines when the booster pump is operating. It has been seen that this has resulted in greater drilling feeds and speeds than previously known with any single stage coolant system.

The two stage coolant supply system is applicable to pneumatic as well as electrically operated pump equipment. It has shown particular advantage where air-operated reciprocal pumps are used which are driven off a common air pressure line running throughout the shop or factory, providing both high flow volume and high fluid pressure which cannot be efficiently achieved by a solitary air operated reciprocal pump operating from the same shop air pressure line. In the present system, both high volume and high pressure are efficiently achieved, albeit intermittently, in this system through the use of this two stage parallel pump configuration, resulting in better drill operation. An additional advantage of this system when practiced with pneumatic pumps is that it is easily built, largely through the relatively simple addition to an existing coolant system of an air-operated reciprocal pump capable of generating a pressure greater than the primary fluid pump conventionally employed, such that the two pumps operate in parallel with the high pressure pump acting as a booster pump.

The foregoing objectives, features and advantages of the present invention will be more readily understood upon consideration of the following detailed description of the invention taken in conjunctions with the accompanying drawings, in which:

DETAILED DESCRIPTION OF THE INVENTION

Figure 1:
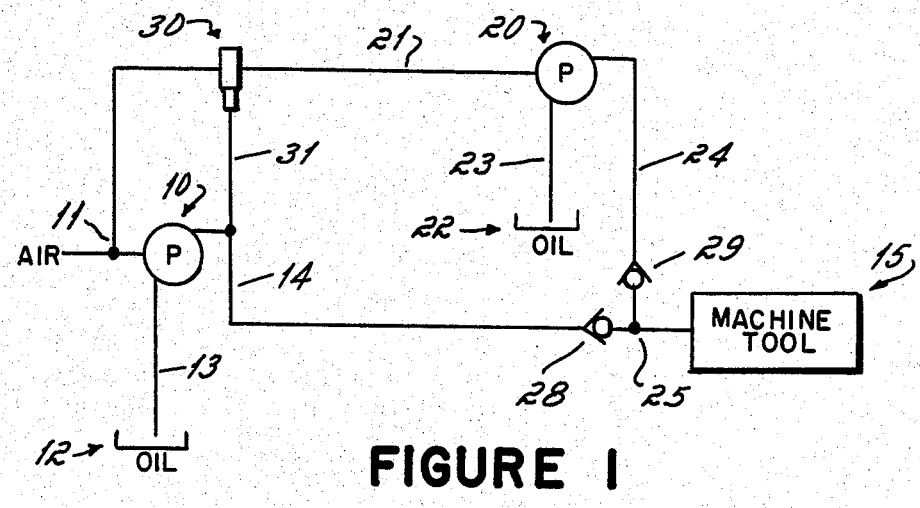
FIG. 1 is a schematic diagram of a coolant supply system made in accordance with the principles of this invention which utilizes air-operated reciprocal pumps.

Referring now to FIG. 1, a first embodiment of this invention is shown as adapted for use with air-operated reciprocal pumps. In general, a system for supplying coolant to a drill for machining a hole in a workpiece during a drilling operation made in accordance with the type of system shown in U.S. Pat. No. Re. 26,975 will include a high volume air-operated reciprocal pump unit 10 having a pneumatic motor driven by a supply of air under pressure to produce the distinctive pulsed coolant flow. Coolant fluid, such as oil, is supplied to the pump 10 from a reservoir or sump 12 via interconnecting line 13. A Giant Jet Pulser pump manufactured by the Wheelabrator-Frye Corporation is commonly used as the high volume pump 10. This pump produces a 10:1 ratio of oil to air pressure, with a delivery rate of about 8 gallons per minute with no back pressure present. Coolant fluid pumped by the high volume pump 10 progresses into a first or primary line 14 which carries the coolant to a machine tool 15, such as a conventional drill press or turret lathe, for example. The coolant is fed to a conventional oil hole drill which has a longitudinal passageway extending axially therein having an opening at the tip of the drill through which the coolant fluid ultimately passes to cool both the drill and the workpiece with which the drill is engaged.

As the drilling operation progresses and the drill advances deeper into the workpiece, chips may become impacted or otherwise jammed in the flutes of the drill causing a back pressure to develop in the flow of coolant in line 14. As a consequence of this increase in back pressure, the rate of delivery of fluid coolant through the drill will begin to drop. In order to alleviate this build up of back pressure by, in effect, blowing out or dislodging the impacted chips, a second and high pressure air-operated reciprocal pump 20 is incorporated in the coolant fluid supply system. This higher pressure booster pump is similar in construction to that of high volume pump 10, but provides a 16:1 ratio of oil to air pressure. Higher pressure pumps having ratios of 15:1 thru 25:1 are commercially available.

Booster pump 20 has a pneumatic motor which is driven off the common supply of pressurized air 11, air being supplied to the pump 20 through line 21. A similar supply of fluid coolant, such as oil, is provided in reservoir 22 which communicates with the pump 20 through line 23. It will be recognized that coolant reservoirs 12 and 22 may be a single common reservoir for both pumps.

The higher pressure pulsed fluid pumped by pump 20 is carried through line 24, which here is shown combining with the primary coolant line 14 at junction 25. It should be noted that the volume of coolant added to the line 14 by booster pump 20 is relatively small compared to the volume pumped by the high volume pump 10.

The pulsed coolant fluid from booster pump 20 is at a much higher peak pressure than that of the coolant fluid pumped by high volume pump 10. It is presently contemplated that the fluid pressure supplied by the high pressure pump 20 should be around 50% greater than that produced by the high volume pump 10 for optimal results.

Conventional check valves 28 and 29 are respectively located in the primary coolant line 14 and the booster coolant line 24 from the pump 20. The check valves 28, 29 are oriented to prevent back flow induced by either of the pumps when such are in operation, and may be advantageously located adjacent the junction 25 of the two lines.

In this system, the high volume pump 10 is designed to provide a continuous pulsed flow of coolant through the drill of the machine tool 15. High pressure pump 20 functions only intermittently to provide a high pressure pulsed coolant fluid flow which is added to the primary coolant flow in response to the build-up of back pressure to the flow of coolant through the drill. The high pressure pump 20 is operated herein through the use of a pilot operated valve 30. The valve 30 is located in the air supply line 21 to the booster pump 20 and serves to open and close that line when actuated and deactuated to drive the pneumatic motor of the booster pump 20. The valve 30 is operatively connected to coolant line 14 through the use of a control line 31, which is tapped into primary line 14. The pilot valve 30 is adjusted such that when the back pressure in primary coolant line 14 reaches a predetermined level, the valve 30 is actuated and pressurized air flows through line 21 to drive the motor of the booster pump 20, which in turn institutes the second and high pressure coolant fluid flow through the drill. When the back pressure has dropped below a predetermined level, through the action of the higher pressure flow of pulsed coolant added to the diminished primary coolant flow, the pilot valve 30 is deactuated cutting off the flow of pressurized air through line 21. It will be understood that a solenoid valve, manually operated valve, etc., may also be easily adapted for use as the valve 30 in this system.

In operation, air pressure is initially supplied only to the high volume reciprocal pump 10 by the connecting line 11. Air pressure is usually supplied in the neighborhood of 90 p.s.i. The high volume pump 10 pumps a continuous and pulsed flow of fluid through primary coolant line 14 to the oil hole drill of machine tool 15. When back pressure begins to develop in line 14 due to the build up or impaction of chips in the flutes of the drill, pilot operated valve 30 is actuated at a predetermined threshold back pressure level detected in line 14 through control line 31. Pressurized air then flows through line 21 to operate the pneumatic motor of high pressure reciprocal pump 20 to institute a second high pressure pulsed fluid flow through line 24 which joins with primary coolant line 14. This high pressure booster flow is added to the primary coolant flow with the higher and lower pressure pulses being superimposed, resulting in the dislodging of impacted chips, etc. and substantial reduction or elimination of the back pressure to the primary coolant flow. When the back pressure drops below a predetermined level, pilot valve 30 is deactuated and high pressure pump 20 shut down.

Figure 3:
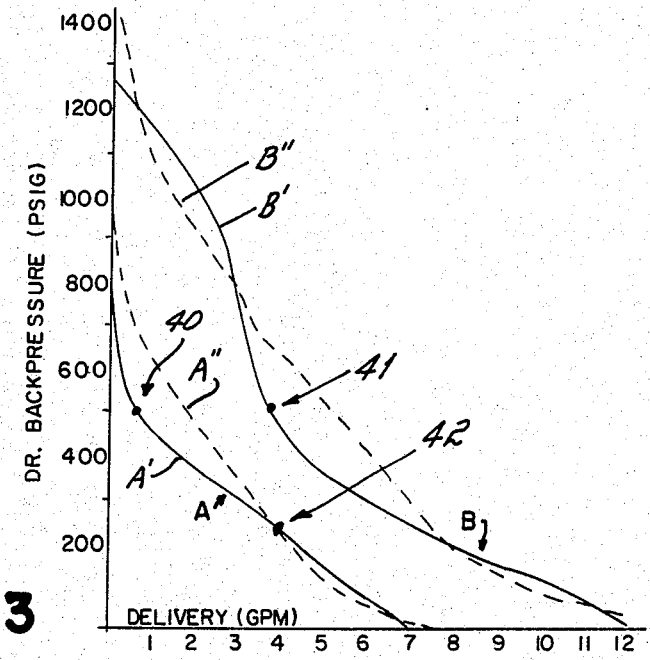
FIG. 3 is a graphical illustration showing drill back pressure versus delivery rate for a pulsed high volume flow alone, and when operated in conjunction with a booster high pressure pulsed flow, illustrating the difference achieved through use of the two stage system of this invention.

The effectiveness of the two stage coolant flow system of the invention is illustrated in the graph of FIG. 3. The graph shows coolant delivery rate in gallons per minute (g.p.m.) along the abscissa with drill back pressure in pounds per square inch gauge (psig) along the ordinate. Data are shown for operation of a primary high volume pump 10 operated alone and in a conventional manner (graph A), and in the system of the present invention utilizing a second and booster pump 20 (graph B). Two separate tests were run in each instance using respectively an air supply of 80 psig (A', B', solid line) and an air supply of 100 psig (A'', B'', dotted line). Back pressure was established using an adjustable valve in the primary line 14, and downstream from the junction 25.

It will be immediately seen that the overall delivery rate of coolant fluid to the drill was significantly increased with the high volume and high pressure pumps 10 and 20 operating (graph B) compared to the high volume pump 10 operating alone (graph A). For example, with a back pressure of 500 psig, coolant fluid flow increased from 1 gpm (noted at 40 of A') when the high volume pump 10 was operated alone to 4 gpm (noted at 41 of B') with the booster pump 20 operating. From a different perspective, a constant flow of coolant fluid of 4 gpm with a back pressure of approximately 500 psig was obtainable with the primary and booster pumps both operating (41 of B') compared to the same delivery rate at a back pressure of only 200 psig (42 of A') for the primary pump 10 operating alone.

Figure 2:
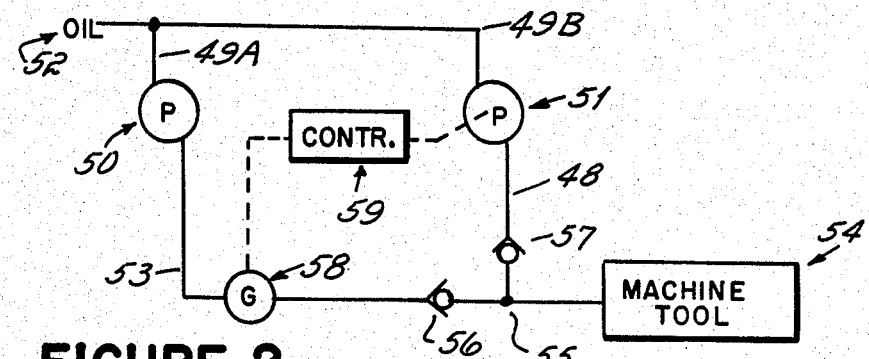
FIG. 2 is a schematic diagram of an alternate embodiment of the invention adapted specifically for use with electric pumps.

Referring now to FIG. 2, an alternate embodiment of the invention is schematically shown adapted for use with conventional electrically driven reciprocal pumps rather than the air operated reciprocal pumps described in relation to the embodiment of FIG. 1. The two stage system is basically the same, comprising a high volume primary pump 50 and a secondary high pressure booster pump 51. The high volume pump 50 is supplied with coolant through a line 49A from a reservoir 52, and pumps the coolant in a pulsing flow through primary coolant line 53 to the drill of machine tool 54. The high pressure booster pump 51 is likewise supplied with coolant through a line or conduit 49B from the reservoir 52, which it pumps at higher pressure and in a pulsating flow through line 48 which joins primary line 53 at junction 55. Check valves 56 and 57 are respectively located in the coolant lines 53 and 48.

Means for measuring the amount of back pressure to the primary flow of coolant through line 53 is incorporated in the line, such as a pressure gauge 58. This pressure gauge in turn communicates with a control mechanism 59 such as a switch, which provides a signal to the electric pump 51 to turn it on and off. That is, when the back pressure detected by pressure gauge 58 reaches a predetermined level, control mechanism 59 sends a signal to booster pump 51 which actuates the pump to thereby supply a high pressure flow of pulsed coolant to the drill to dislodge chips giving rise to the back pressure. Once the back pressure drops below a predetermined level as detected by the gauge 58, the booster pump 51 deactuated by the control mechanism 59.

Thus, while the invention has been described in connection with certain presently preferred embodiments, it will be immediately obvious to those skilled in the art that many modifications of structure, arrangement, portions, elements, materials and components can be used in the practice of this invention without departing from the principles of this invention. Additionally, while the invention has been described as applicable to a drilling operation, the term drilling has been used and is intended to be used in its broadest sense to include machining of a hole, such as a blind hole, in a workpiece, as for example by tapping, end milling, reaming, etc. Furthermore, it will be immediately obvious that combinations of electric as well as pneumatic motors may be used to achieve the improved results of this invention, depending upon the equipment available and the specific environment to which the system is to be adapted.

What is claimed is:

1. A method of drilling a hole in a workpiece which comprises the steps of:
    effecting relative rotational of movement between a workpiece and a drill with the drill engaging the workpiece,
    supplying a first coolant fluid flow through a passageway in the drill, which passageway terminates adjacent the tip of the drill, the first coolant flow being supplied under pressure by a first pump and in a pulsating flow,
    supplying a second coolant fluid flow through the passageway in the drill, the second coolant flow being supplied under pressure by a second pump and in a pulsating flow, the second pump supplying the second flow under greater pressure than the first flow,
    initiating the second fluid flow in response to the build-up of back pressure to the first fluid flow to thereby flush chips away from the tip of the drill causing such back pressure, and
    terminating the second fluid flow in response to a drop of back pressure to the first fluid flow.

2. A method of drilling a hole in a workpiece with a drill having a longitudinal passageway which terminates near the tip of the drill and through which passageway a coolant fluid can flow, comprising the steps of:
    effecting relative rotational movement between the workpiece and the drill with the drill in engagement with the workpiece,
    supplying a first coolant fluid flow through a conduit and into the longitudinal passageway, the first coolant fluid flow being supplied in a pulsating flow through the drill by varying the pressure of the first coolant fluid,
    supplying a second coolant fluid flow into the longitudinal passageway, the second coolant fluid flow being supplied in a pulsating flow through the drill by varying the pressure of the second coolant fluid, the second coolant flow being supplied at a greater pressure than the first coolant flow,
    initiating the second fluid flow in response to a build-up to a predetermined level of back pressure to the first fluid flow to thereby relieve such back pressure, and
    terminating the second fluid flow in response to a drop in back pressure to the first fluid flow below a predetermined level.

3. A method of drilling a hole in a work piece with a drill having a longitudinal passageway which terminates near the tip of the drill and through which passageway coolant fluid can flow comprising the steps of:
    effecting relative rotational movement between the work piece and the drill with the drill in engagement with the workpiece, supplying to the drill a first coolant fluid in a pulsating flow by varying the pressure of the coolant flowing through the drill, providing to the drill a second coolant fluid in a pulsating flow by varying the pressure of the coolant flowing through the drill, the second coolant fluid being provided at a higher peak pressure than the first coolant fluid, and supplying the second coolant fluid to the drill in response to the build-up of back pressure to the flow of the first coolant fluid through the drill beyond a pre-determined level to thereby relieve such back pressure.

4. The method of claim 3 wherein the peak pressure of the second coolant fluid is at least 50% greater than that of the first coolant fluid.

5. The method of claim 3 wherein the coolant fluid is a liquid coolant.

6. The method of claim 3 further including the step of terminating the flow of the second coolant fluid in response to a drop in back pressure to the flow of the first coolant fluid beyond a pre-determined level.

7. A method of drilling a hole in a workpiece with a drill having a longitudinal passageway which terminates near the tip of the drill and through which passageway coolant fluid can flow, comprising the steps of:

effecting relative rotational movement between the workpiece and the drill with the drill in engagement with the workpiece, supplying a first coolant fluid through the drill passageway at regularly varying pressure whereby the coolant pulses in its flow through the drill, providing a second coolant fluid through the drill passageway at a regularly varying pressure greater than that of the first coolant fluid, whereby the second coolant pulses in its flow through the drill, initiating the second fluid flow in response to the build-up of back pressure to the flow of the first coolant fluid through the drill in a pre-determined level to thereby relieve such back pressure, and terminating the second fluid flow in response to a drop of back-pressure to the first fluid flow below a predetermined level.

8. A method of drilling a hole in a workpiece with a drill having a longitudinal passageway which terminates near the tip of the drill and through which passageway coolant fluid can flow, comprising the steps of:

effecting relative rotational movement between the workpiece and the drill with the drill in engagement with the workpiece, supplying a first coolant fluid through the drill passageway at regularly varying pressure through the use of a first pump having a pneumatic motor for driving the pump, whereby the coolant pulses in its flow through the drill, providing a second coolant fluid through the drill passageway at a regularly varying pressure greater than that of the first coolant fluid through the use of a second pump having a pneumatic motor for driving the pump, the pressure of the second coolant fluid being greater than that of the first coolant fluid, whereby the second coolant pulses in its flow through the drill, initiating the second fluid flow in response to the build-up of back pressure to the flow of the first coolant fluid through the drill to a pre-determined level to thereby relieve such back pressure, and terminating the second fluid flow in response to a drop of back pressure to the first fluid flow below a predetermined level.

9. A method for relieving the build-up of back pressure to the flow of a first fluid coolant to a drill in a drilling apparatus, wherein the drill is of the type having a longitudinal passageway with an outlet opening adjacent to the tip thereof through which the fluid coolant passes under pressure, comprising the steps of:

providing a second fluid coolant to the drill in a pulsating flow by varying the pressure of the second fluid coolant, the second fluid coolant being provided at a peak pressure greater than that of the first fluid coolant, and supplying the second coolant fluid to the drill in response to the build-up of back pressure to the flow of the first coolant fluid through the drill beyond a pre-determined level to thereby relieve such back pressure.

10. The method of claim 9 wherein the first fluid coolant is also supplied in a pulsating flow.

11. The method of claim 10 wherein the peak pressure of the second fluid flow is about 50% greater than that of the first fluid flow.

12. A method of drilling a hole in a workpiece with a drill having a longitudinal passageway which terminates near the tip of the drill and through which passageway coolant fluid can flow, comprising the steps of:

effecting relative rotational movement between the workpiece and the drill with the drill in engagement with the workpiece supplying a first coolant fluid through the drill passageway at regularly varying pressure through the use of a high volume reciprocating pump whereby the coolant pulses in its flow through the drill, providing a second coolant fluid through the drill passageway at a regularly varying pressure greater than that of the first coolant fluid through the use of a high pressure reciprocating pump, the pressure of the second coolant fluid being greater than that of the first coolant fluid, whereby the second coolant pulses in its flow through the drill, initiating the second fluid flow in response to the build-up of back pressure to the flow of the first coolant fluid through the drill beyond a pre-determined level to thereby relieve such back pressure, and terminating the second fluid flow in response to a drop of back-pressure to the first fluid flow below a predetermined level.

13. The method of claim 12 wherein each pump is pneumatically driven.

14. A method of drilling a hole in a workpiece with a drill having a longitudinal passageway which terminates near the tip of the drill and through which passageway coolant fluid can flow, comprising the steps of:

effecting relative rotational movement between the workpiece and the drill with the drill in engagement with the workpiece, supplying to the drill a first coolant fluid in a pulsating flow by varying the pressure of the coolant flowing through the drill, providing to the drill a second coolant fluid in the pulsating flow by varying the pressure of the coolant flowing through the drill, the second coolant fluid being provided at a higher peak pressure than the first coolant fluid, and supplying the second coolant fluid to the drill through the actuation of a pilot valve responsive to the build-up of back pressure to the flow of the first coolant fluid through the drill beyond a pre-determined level.

15. In a machine for drilling a hole in a workpiece which includes a drill of the type having an axial passageway terminating adjacent to the tip of the drill, an improved coolant apparatus for the drill and workpiece comprising:
   a first pump for pumping a first coolant fluid through the drill passageway at regularly and varying pressure whereby the coolant pulses in its flow through the drill,
   a first conduit for carrying the first coolant fluid from the first pump to the drill passageway,
   a second pump for pumping a second coolant fluid through the drill passageway at regularly varying pressure whereby the coolant pulses in its flow through the drill, the second pump providing the second coolant flow at a greater peak pressure than that of the first coolant flow,
   a second conduit for carrying the second coolant fluid from the second pump to the drill passageway,
   check valves in the first and second conduits preventing back-flow through the conduits, and
   control means for actuating and deactuating the second pump, which control means is responsive to the pressure developed in the first conduit, the control means serving to actuate the second pump when the pressure in the first conduit exceeds a pre-determined level and to deactuate the second pump when the pressure in the first conduit falls below a predetermined level.

16. The improved coolant apparatus of claim 15 wherein the first pump is a high volume pump which continuously pumps the first coolant fluid, and the second pump is a high pressure pump intermittently operated by the control means.

17. The improved coolant apparatus of claim 15 wherein the pressure of the second coolant flow is about 50% greater than that of the first coolant flow.

18. The improved coolant apparatus of claim 15 wherein the second pump generates a coolant fluid pressure about 50% greater than that of the first pump.

19. The improved coolant apparatus of claim 16 wherein both pumps are pneumatically driven from a common source of air under pressure operatively connected to the pumps by respective air conduits.

20. The improved coolant apparatus of claim 19 wherein the control means is a pilot actuated valve which is operatively connected into the first conduit and the air conduit to the second pump, such that actuation of the valve by the build-up of pressure in the first conduit causes air to flow to the second pump thereby driving it, and deactuation of the valve by the decrease in pressure in the first conduit terminates the flow of air to the second pump.

21. The improved coolant apparatus of claim 19 wherein the control means includes a solenoid operated valve which is operatively connected into the air conduit to the second pump, pressure responsive means for measuring the pressure in the first conduit, and a signal generating means associated with the pressure responsive means serving to actuate and deactuate the valve in response to, respectively, the build-up and decrease in pressure in the first conduit.

22. The improved coolant apparatus of claim 16 wherein at least one pump is electrically driven.

23. The improved coolant apparatus of claim 22 wherein the second pump is an electrically driven pump, and the control means includes pressure responsive means for measuring the pressure in the first conduit, and a switch associated with the pressure responsive means serving to actuate and deactuate the second pump in response to, respectively, the build-up and decrease in pressure in the first conduit.

24. An improved apparatus for relieving the build-up of back-pressure to the flow of a first fluid coolant in a drilling machine which includes a drill of the type having a longitudinal passageway with an outlet opening adjacent to the tip thereof through which passageway the fluid coolant passes under pressure, the first fluid coolant being carried in a conduit from the first pump to the drill passageway, comprising:
   a second pump for pumping a second coolant fluid through the drill passageway at regularly varying pressure whereby the coolant pulses in its flow through the drill, the second coolant fluid being provided at a higher peak pressure than that of the first coolant fluid,
   a conduit for carrying the second coolant fluid from the second pump to the drill passageway, and
   check valves in the first and second conduits preventing back-flow through the conduits,
   control means for actuating and deactuating the second pump which is responsive to the pressure developed in the first conduit, the control means serving to actuate the second pump when the pressure in the first conduit exceeds a pre-determined level, and to deactuate the second pump when the pressure in the first conduit falls below a pre-determined level.

25. The improved apparatus of claim 24 wherein the first fluid coolant is also supplied in a pulsating flow.

26. The improved apparatus of claim 25 wherein the second pump generates a coolant fluid pressure about 50% greater than that of the first pump.

27. In a drilling apparatus which includes a drill of the type having a longitudinal passageway including an outlet opening adjacent to the tip of the drill, an improved coolant supply system for the drill comprising:
   a primary pump for pumping a first coolant fluid through the drill passageway at regularly varying pressure whereby the coolant pulses in its flow through the drill,
   a booster pump for pumping a second coolant fluid through the drill passageway at regularly varying pressure whereby the coolant pulses in its flow through the drill, the booster pump providing the second coolant flow at a greater peak pressure than that of the first coolant flow,
   a reservoir of liquid coolant for the pumps and lines for supplying the liquid coolant to the pumps,
   a first conduit for carrying the first coolant fluid from the primary pump to the drill passageway,
   a second conduit for carrying the second coolant fluid from the booster pump to the drill passageway,
   check valves in the first and second conduits preventing back flow through the conduits, and
   control means for actuating and deactuating the booster pump which is responsive to the pressure developed in the first conduit, the control means serving to actuate the booster pump when the pressure in the first conduit exceeds a pre-determined level, and to deactuate the second pump when the pressure in the first conduit falls below a pre-determined level.

28. An improved apparatus for relieving the build-up of back pressure to the flow of a first fluid coolant in a drilling apparatus which includes a drill of the type having a longitudinal passageway with an outlet opening adjacent to the tip thereof through which the fluid coolant passes under pressure, comprising:

means for providing to the drill a second fluid coolant in a pulsating flow by varying the pressure of the second fluid coolant, the second fluid coolant being provided at a peak pressure greater than that of the first fluid coolant, and means for supplying the second coolant fluid to the drill in response to the build-up of back-pressure to the flow of the first coolant fluid through the drill beyond a predetermined level to thereby relieve such back-pressure.

* * * * *